UNITED STATES PATENT OFFICE.

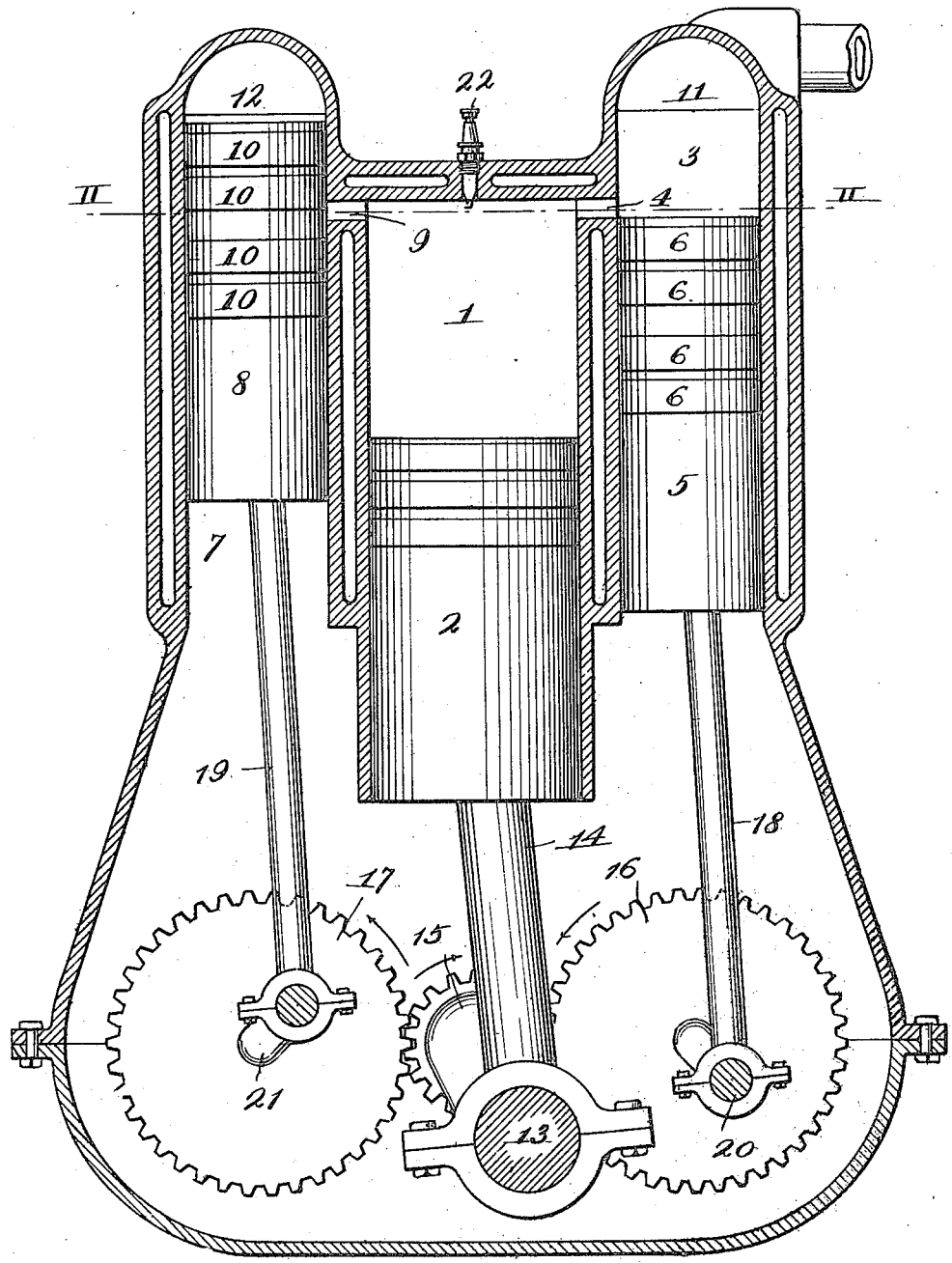

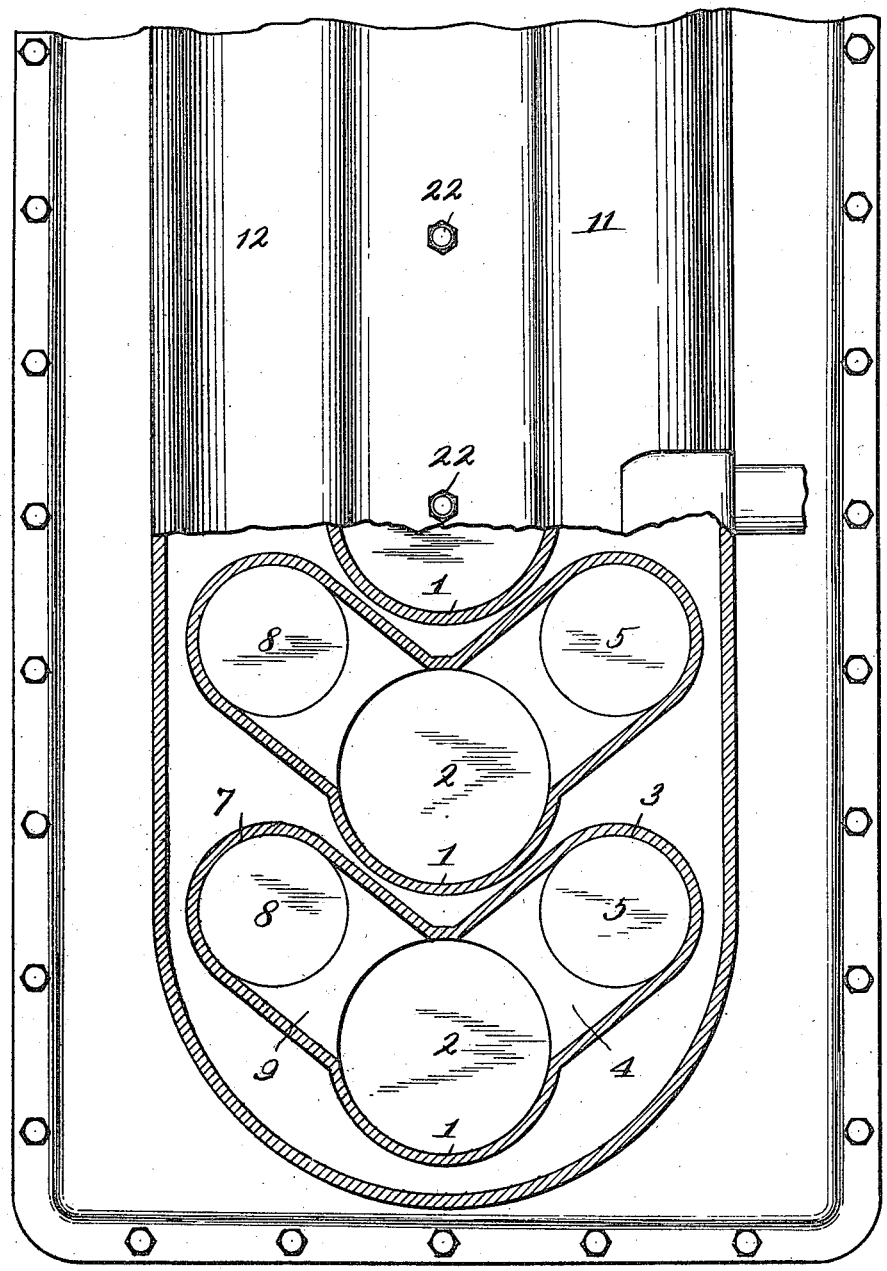

ALVA E. ROOT, OF PLEASANTON, KANSAS.

INTERNAL-COMBUSTION ENGINE.

1,269,119.   Specification of Letters Patent.   Patented June 11, 1918.

Application filed April 21, 1916. Serial No. 92,642.

*To all whom it may concern:*

Be it known that I, ALVA E. ROOT, a citizen of the United States, residing at Pleasanton, in the county of Linn and State of Kansas, have invented certain new and useful Improvements in Internal-Combustion Engines, of which the following is a specification.

My invention relates to improvements in internal combustion engines, and the novelty of the present invention relates more particularly to the valve mechanism.

Instead of employing the usual puppet valves, I employ reciprocable piston valves arranged adjacent the engine cylinder to control the intake of the combustible mixture and exhaust of the burnt gases to and from said cylinder.

By the use of my invention leakage of gas from the cylinder during the compression stroke is overcome, as is also the accumulation of carbon at the valves and the inlet and exhaust ports, so that the difficulties usually arising from this source are eliminated.

The valves are noiseless in operation and subject to little or no wear, as the pounding action to which puppet valves are subjected is entirely overcome. The construction of the valves, also, is such as to provide for ready cooling of the main piston and the valves themselves by circulation of water thereabout. The intake valve also serves to draw in a charge of the combustible mixture at each downward stroke, while the exhaust valve serves to expel the burnt gases, thereby insuring economy and efficiency in the use of fuel.

Other features and advantages will hereinafter appear, and in order that the invention may be fully understood, reference will now be made to the accompanying drawings, in which:

Figure 1 is a sectional diagrammatic view of an engine embodying the invention.

Fig. 2 is a broken plan view of the engine partly in section on the plane of line II—II of Fig. 1.

1 designates the engine cylinder in which the main piston 2 is reciprocably mounted.

3 designates an intake chamber which communicates with the engine cylinder 1 through an ingress port 4, controlled by a reciprocatory piston valve 5, provided with packing rings 6 to prevent leakage of gas around said valve.

7 designates an exhaust chamber in which a piston valve 8 is reciprocably mounted. Said exhaust chamber 7 communicates with the engine cylinder 1 through an egress port 9, closed at the proper time by the valve 8, which, like the valve 5, has piston rings 10.

The intake and exhaust chambers 3 and 7, communicate at their upper portions with supply and exhaust ducts 11 and 12, and extend above the ports 4 and 9 to permit the valves 5 and 8, respectively, to move up high enough to close said ports.

The main crank shaft 13 to which the piston 2 is connected by a pitman 14, is provided with a small gear wheel 15, which intermeshes with two oppositely-disposed gear wheels 16 and 17 connected to the piston valves 5 and 8, to actuate the same, through the intermediacy of pitmen 18 and 19, respectively. The pitmen 18 and 19, are connected to crank-shafts 20 and 21, respectively, of less throw than the main crank shaft 13. The gear wheel 15 is about one-half the diameter of the gear wheels 16 and 17, so that the latter will only make one revolution to two revolutions of said gear wheel 15. Thus it will be understood that the piston 2 travels twice as fast as the valves 5 and 8. The piston 2 also has a longer stroke than the valves.

In the diagram, Fig. 1, the main piston 2 is shown at, substantially, the lower end of its suction stroke while the valve 5 is open to allow the combustible mixture to be drawn into the cylinder 1. The valve 8 is closed and before the piston starts on its upward stroke the valve 5 closes, hence the charge within the cylinder 1 cannot escape therefrom. As the piston 2 moves upward to compress the charge, the valves 5 and 8, also move upward with the valve 8 in the lead, so that it will move down to uncover the port 9 soon after the piston 2 has reached the end of the compression stroke and the charge has been exploded through the intermediacy of the spark plug 22, the parts being so timed that after the explosion the valve 8 begins to uncover the port 9, to allow the burnt gases to be forced out of the cylinder 1 and into the duct 12 on the return stroke of the piston 2. After the piston 2 has moved upwardly and expelled the burnt gases the valve 5 opens to permit a fresh charge to be drawn into the cylinder 1 as the piston moves downward, while the valve 8 closes to retain said charge until the same is compressed and ignited.

At the time the explosion occurs the valves 5 and 8 are so disposed that two packing rings are above and two below the respective ports 4 and 9, and consequently no leakage of gas can occur. When the valve 5 moves downward it draws the combustible mixture into the chamber 3, so that it can be readily drawn into the cylinder 1, as the piston 2 moves downward on a suction stroke. Burned gases forced by the piston 2 into the chamber 12, are expelled from the latter by the valve 8.

While I have described but one piston 2 and one set of inlet and outlet valves, it is to be understood that the invention may be applied to a multicylinder engine as disclosed by Fig. 2.

From the foregoing description it will be understood that I have produced a simple and efficient motor embodying all of the advantages above enumerated, and while I have shown and described the preferred form of my invention, it is to be understood that such changes in the construction, combination, and arrangement of parts may be made as properly fall within the spirit and scope of the claims.

Having thus described my invention, what I claim and desire to secure by Letters Patent, is:

In an internal combustion engine, main cylinders arranged in longitudinal alinement and having pistons therein, inlet and exhaust cylinders arranged in respective longitudinal alinement on opposite sides of the main cylinders and each having a piston valve therein, the inlet and exhaust cylinders for the respective main cylinders being connected thereto by inclined ports having side walls arranged so as to form with the inlet and exhaust cylinders, a V the apex of which V is defined by the main cylinders, the inner of said side walls defining the inclined ports receiving the next adjacent main cylinder therebetween, a pair of longitudinal spaced parallel ducts common to each of the respective inlet and exhaust cylinders, and a horizontal plate connecting the inner sides of said ducts, said ducts spanning the respective inlet and exhaust cylinders and portions of the inclined ports thereof.

In testimony whereof I affix my signature, in the presence of a witness.

ALVA E. ROOT.

Witness:
F. G. FISCHER.

Copies of this patent may be obtained for five cents each, by addressing the "Commissioner of Patents, Washington, D. C."